United States Patent
Butler et al.

(10) Patent No.: US 7,030,734 B2
(45) Date of Patent: Apr. 18, 2006

(54) VERIFICATION OF PROPER COUPLING OF POWER LINE COMMUNICATION UNITS TO POWER CIRCUITS

(75) Inventors: Craig N. Butler, Portland, OR (US); Akimasa Fleshler, Portland, OR (US); Stuart A. Friedberg, Aloha, OR (US); Paul E. McKenney, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/500,524

(22) PCT Filed: Jan. 2, 2002

(86) PCT No.: PCT/US02/00541

§ 371 (c)(1),
(2), (4) Date: Jun. 30, 2004

(87) PCT Pub. No.: WO03/061260

PCT Pub. Date: Jul. 24, 2003

(65) Prior Publication Data

US 2005/0017846 A1 Jan. 27, 2005

(51) Int. Cl.
*H04M 11/04* (2006.01)

(52) U.S. Cl. .................. 340/310.11; 340/310.12; 340/310.18; 340/538

(58) Field of Classification Search ............. 340/310.01, 340/310.08, 538, 310.11, 310.12, 310.16, 340/310.17, 310.18, 538.11, 538.15, 538.16, 340/538.17; 379/33, 37, 44
See application file for complete search history.

(56) References Cited

U.S. PATENT DOCUMENTS 6,005,475 A * 12/1999 Takasan et al. ......... 340/310.01
6,072,858 A     6/2000 Bellin
6,114,947 A * 9/2000 Tondorf ................. 340/310.01

FOREIGN PATENT DOCUMENTS

DE       195 20 596 A    12/1996
DE       101 20 381 A    11/2001
WO       WO 01/86879 A   11/2001

* cited by examiner

*Primary Examiner*—Anh V. La
(74) *Attorney, Agent, or Firm*—Abdy Raissinia

(57) ABSTRACT

Verifying that power line communication units (106) are properly coupled to power circuits (104) is disclosed. Each of a number of communication units (106) is coupled to one of one or more power circuits (104), and sends an identifier over this power circuit. One or more management components (110) collect the identifier sent by each communication unit, and use at least these identifiers to verify that the communication units (106) are properly coupled to the power circuits (104).

20 Claims, 7 Drawing Sheets

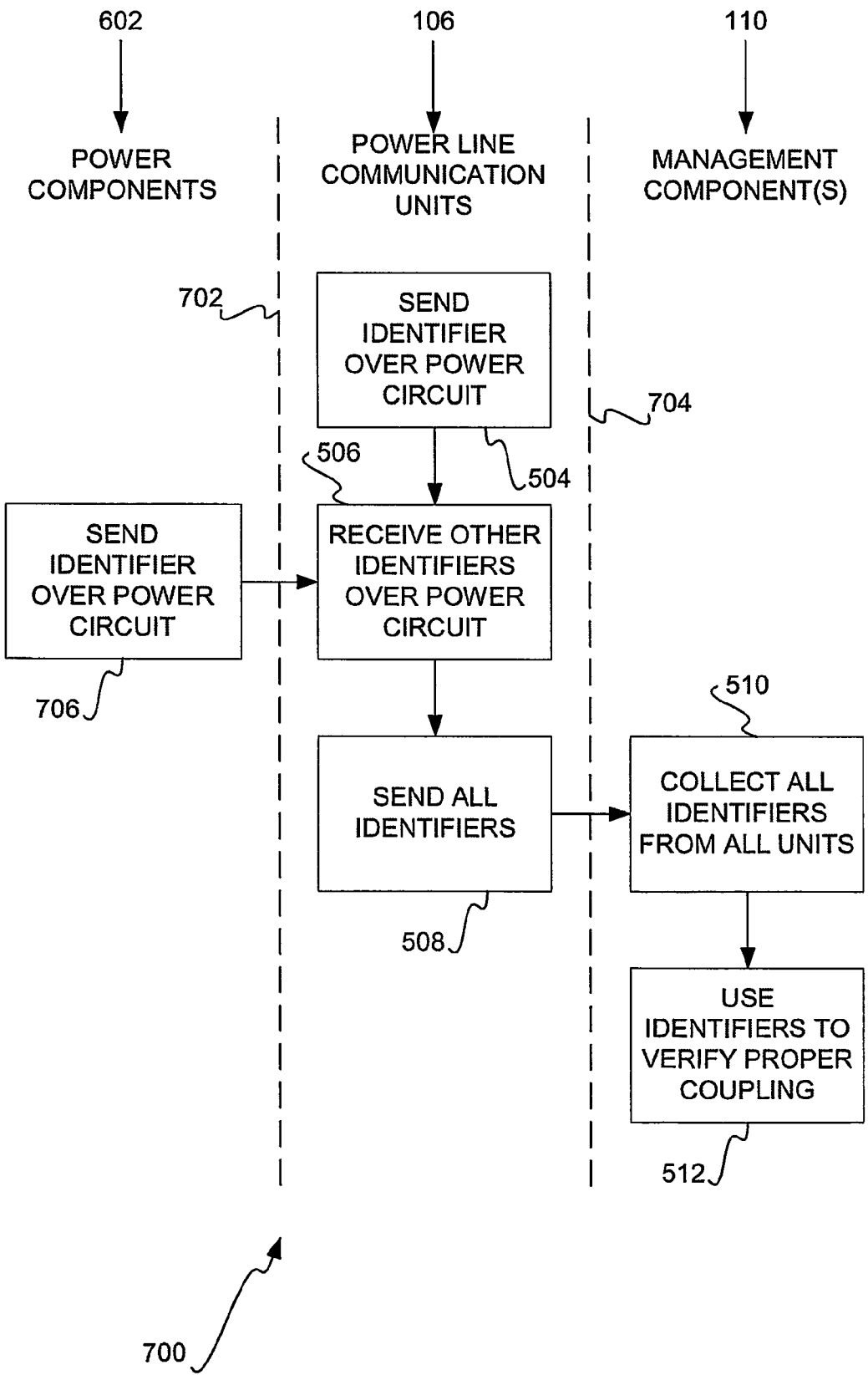

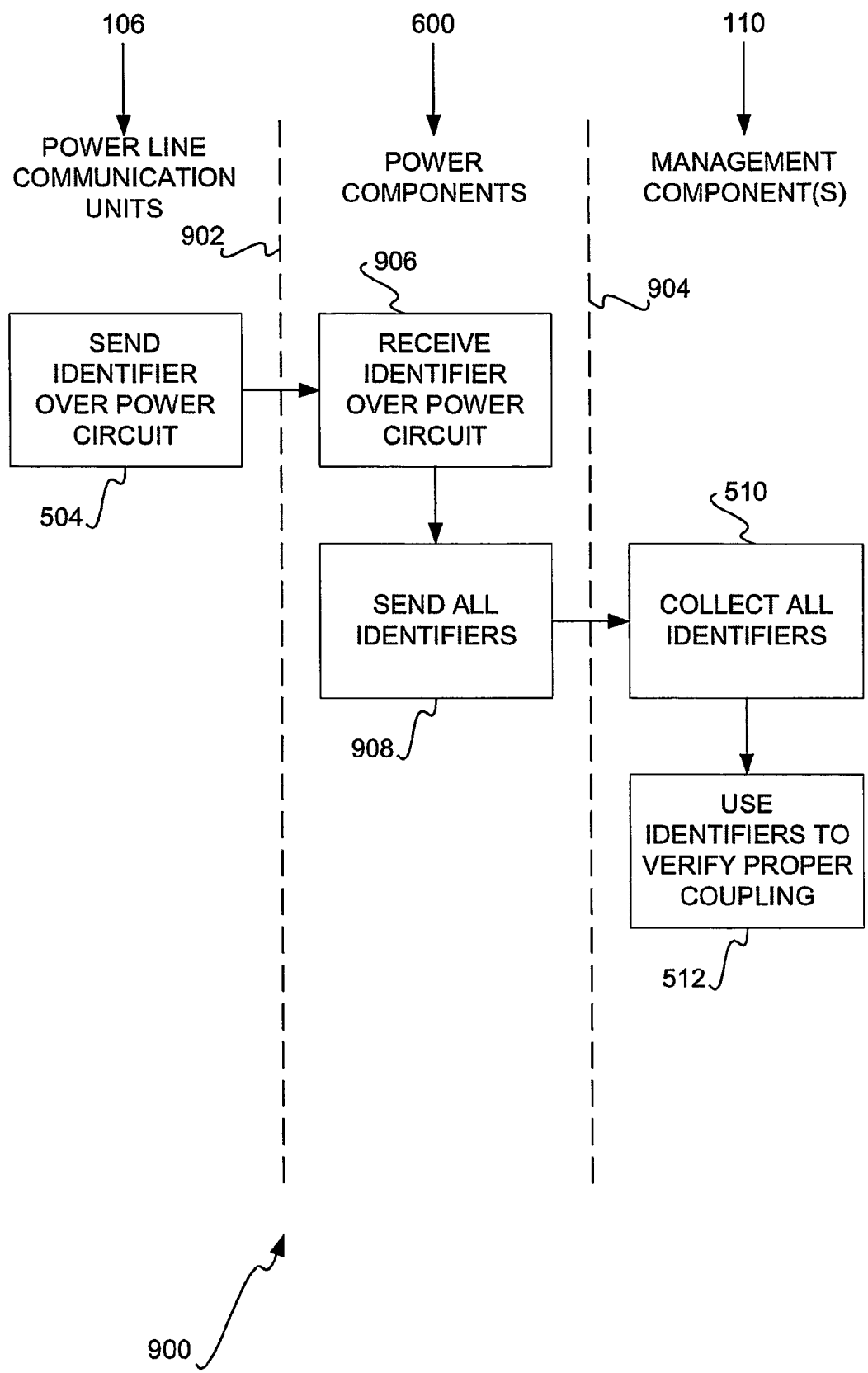

VERIFICATION OF PROPER COUPLING OF POWER LINE COMMUNICATION UNITS TO POWER CIRCUITS

BACKGROUND OF THE INVENTION

1. Technical Field

This invention relates generally to power circuits, and more particularly to verifying that power line communication units that are coupled to such power circuits are properly coupled.

2. Background Art

Many mission-critical systems depend on a constant and reliable supply of power. For example, in the computer world, bank data centers, server farms running electronic business web sites, and other sorts of systems need a constant and reliable source of power. If the systems go down as result of lack of power, this can mean millions of dollars or even more in losses to the owners, such as banks, businesses, and so on.

Therefore, many mission-critical systems have built-in mechanisms for redundant sources of power, or at least for redundant connections to the same source of power. For example, a given system may have two or more power supplies. Each power supply should be connected to a different power circuit. The different power circuits may ultimately depend on the same source of power, such as the electrical grid, or different sources of power, such as the electrical grid and a generator.

However, it is difficult to maintain proper power redundancy in such systems, especially where they service fast-growing workloads. Current practice usually mandates manual verification of which system is fed by which of a number of redundant power circuits. This situation allows human error to result in total failure of the system, even if there is a breakdown affecting only a few or as little as one of the power circuits. If a mission-critical system is allowed to depend on only one of the power circuits, then it can fail if only one circuit goes down.

For this reason, as well as other reasons, there is a need for the present invention.

DISCLOSURE OF INVENTION

The invention relates to verifying that power line communication units are properly coupled to power circuits. A system of the invention includes a number of power line communication units, and one or more management components. Each communication unit is coupled to one of one or more power circuits, and sends an identifier over this power circuit. The management components collect the identifier sent by each communication unit, and use at least these identifiers to verify that the communication units are properly coupled to the power circuits.

An article of manufacture of the invention includes a computer-readable medium and means in the medium. The means in the medium is for sending an identifier of a power line communication unit over a power circuit to which it is coupled, for one or more management components to collect along with identifiers sent by other power line communication units. The management components perform this collection for verifying that the power line communication units are properly coupled to power circuits.

A method of the invention includes first collecting identifiers sent by power line communication units over one or more power circuits to which the communication units are coupled. The method then verifies that the power line communication units are properly coupled to the power circuits, by using at least the identifiers collected. Other features and advantages of the invention will become apparent from the following detailed description of the presently preferred embodiment of the invention, taken in conjunction with the accompanying drawings.

BRIEF DESCRIPTION OF DRAWINGS

FIG. 7 is a flowchart of a method for verifying the configuration of the power line communication units of FIG. 6, according to an embodiment of the invention.

FIG. 9 is a flowchart of a method for verifying the configuration of the power line communication units of FIG. 8, according to an embodiment of the invention.

BEST MODE FOR CARRYING OUT THE INVENTION

Overview

Figure 1:
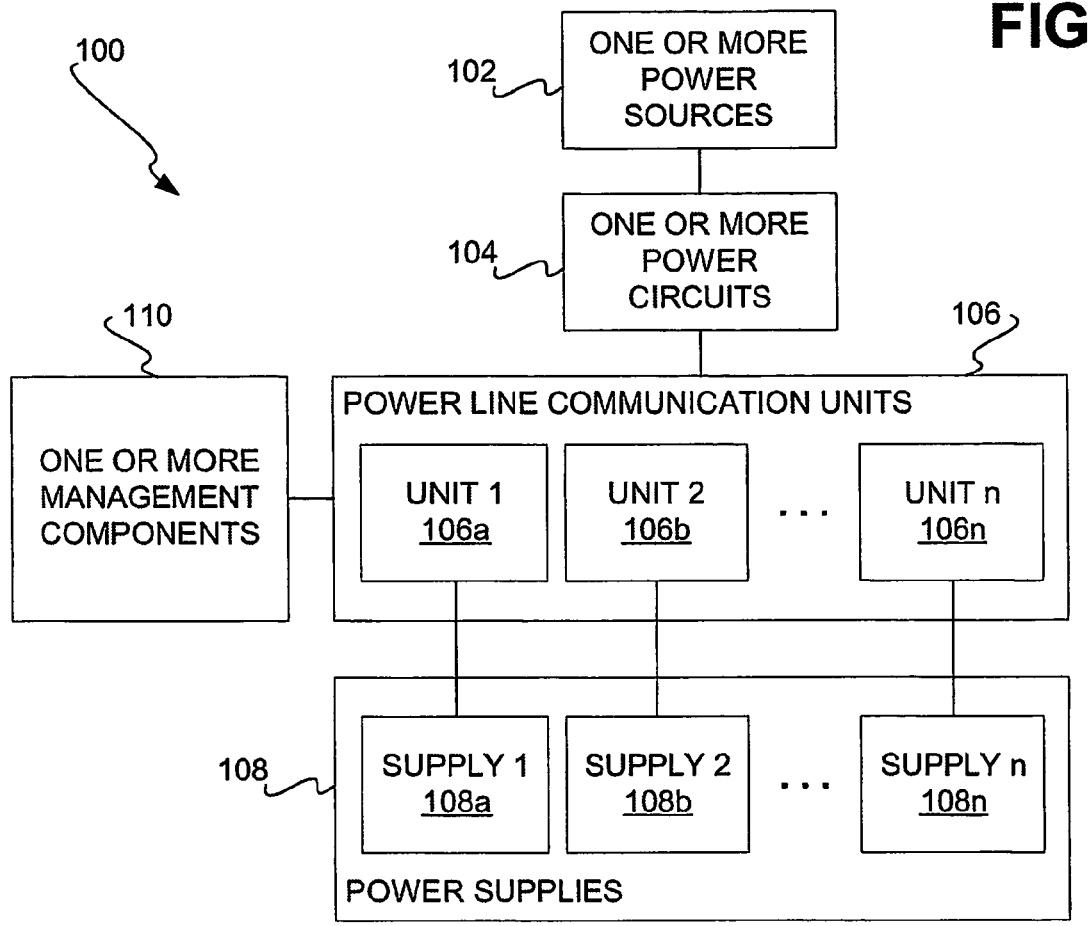
FIG. 1 is a diagram of a system for verification of proper coupling of communication units to power circuits, according to a preferred embodiment of the invention, and is suggested for accompanying the abstract.

FIG. 1 shows a system 100 according to a preferred embodiment of the invention. The system 100 includes one or more power sources 102, one or more power circuits 104, power line communication units 106, power supplies 108, and one or more management components 110. The power sources 102 may include the electrical grid that commonly powers most buildings, as well as alternative sources of power, such as on-site generators, solar power mechanisms, wind power mechanisms, and so on. The power sources 102 may also include multiple electrical grids, for added redundancy. The power circuits 104 are the wires that run from the power sources 102 to the power line communication units 106. Commonly, the power circuits 104 end in two- or three-prong electrical outlets, into which corresponding plugs of the communication units 106 are connected.

The power line communication units 106 include the communication units 106a, 106b, . . . , 106n, and have the capability to send a signal over the power circuits 102 to which they are connected. The units 106 may accomplish this by modulating a signal over the power circuits 102. Such modulation may be accomplished in a proprietary manner, or in accordance with a standard for such communication. For example, the standard may be the X10 standard, described at the Internet web site www.x10.org, the Universal Plug and Play standard, described at the web site www.upnp.org, the Jini standard, described at the web site www.jini.org, or another standard.

The power supplies 108 include the power supplies 108a, 108b, . . . , 108n. Each of the power supplies 108 corresponds to one of the power line communication units 106. The power supplies 108 are the supplies of power that typically plug directly into the one or more power circuits 104, and that transform the power received from the power circuits 104 as appropriate. However, in the system 100, the power line communication units 106 intervene between the power supplies 108 and the power circuits 104. For power supply redundancy, there are two or more of the power supplies 108 for each piece of equipment encompassed by the system 100, which are not specifically depicted in the system 100. Such equipment is more generally referred to as sub-systems. The power line communication units 106 may be integrated with or external to such sub-systems.

The units 106 may also be integrated into the power supplies 108.

Preferably, there is a proper manner by which the power supplies 108 are connected to the one or more power circuits 104 through the power line communication units 106. For instance, for each sub-system having two or more of the power supplies 108, the proper manner may be that such power supplies be ultimately connected to at least two of the power circuits 104, for power circuit redundancy. Therefore, if one of the power circuits 104 to which the sub-system has a power supply connected fails, then power is still received by the sub-system from another of the power circuits 104 through another power supply. This power circuit redundancy is in addition to the power supply redundancy already resulting from the presence of two or more power supplies for each sub-system.

The one or more management components 110 as shown in the system 100 are communicatively coupled to the power line communication units 106, in a wired or a wireless manner. The management components 110 may be hardware, software, or a combination of hardware and software. For example, they may be software programmed to run on a general-purpose computer. There may be one of the management components 110 for each sub-system, which may or may not be networked together. There may also be a single management component 110 for all sub-systems. For instance, where there is a number of sub-systems, a single management component 110 may be responsible for all of them, by being networked to each sub-system.

The system 100 of FIG. 1 preferably operates as follows. Each of the power line communication units 106 sends a unique identifier over the one of the power circuits 104 to which it is coupled. Each of the power line communication units 106 also preferably receives from over its connected-to power circuit the unique identifiers from the other of the communication units 106 connected to the same power circuit. The one or more management components 110 then preferably collect from each of the units 106 the identifier sent by the unit, as well as the identifiers received by the unit. The system 100 uses this information to verify that the power line communication units 106, and hence the power supplies 108, are properly connected to the power circuits 104.

For example, a sub-system may have two power supplies, each having a corresponding power line communication unit. If the first communication unit receives the second communication unit's identifier over the power circuit to which the first communication unit is connected, then the management components 110 can infer that the communication units, and thus the power supplies, of the sub-system are not properly connected to the power circuits 104. This is because each communication unit desirably should be connected to a different power circuit, for power circuit redundancy. However, the fact that the first unit is receiving the second unit's identifier means that the two are connected to the same power circuit. Conversely, if the first unit does not receive the second unit's identifier over the power circuit to which the first unit is connected, then the management components 110 can infer that the two communication units, and thus the two power supplies, of the sub-system are properly connected to the circuits 104.

The system 100 as has been described with reference to FIG. 1 is the preferred embodiment of the invention. However, other embodiments vary aspects of both the topology and operation of the system 100, and are described in subsequent sections of the detailed description. These embodiments, as well as the preferred embodiment, are still encompassed by the invention.

Technical Background

Figure 2:
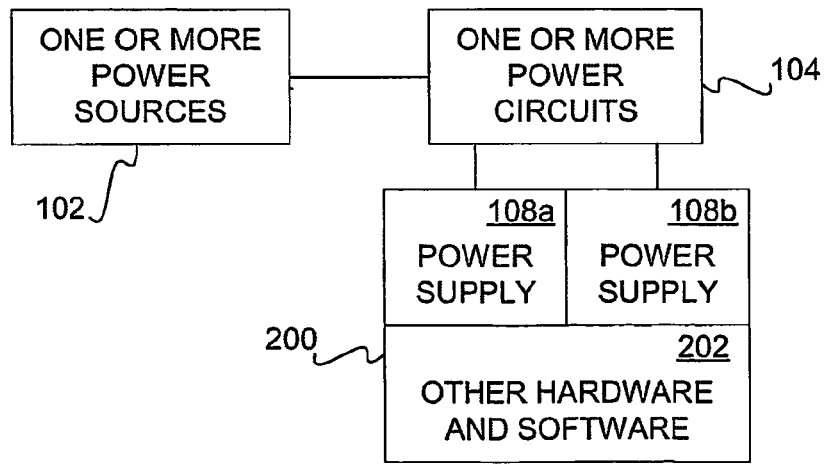
FIG. 2 is a diagram of a sub-system in conjunction with which embodiments of the invention can be implemented.

FIG. 2 shows an example sub-system 200 that can be used in conjunction with embodiments of the invention. The term sub-system as used herein can encompass individual pieces of equipment, such as computer equipment, as well as computer systems, and so on. The term sub-system is used instead of the term system to distinguish the sub-system from a complete system that also encompasses power circuits, power sources, and so on. Only those components of the sub-system 200 necessary for the implementation of embodiments of the invention are specifically called out in FIG. 2.

The sub-system 200 thus has two power supplies 108a and 108b, and all other of its hardware and software is relegated to a common block in FIG. 2 as the other hardware and software 202 of the sub-system 200. The power supplies 108a and 108b are ultimately connected to the one or more power circuits 104, which in turn are connected to the one or more power sources 102. One or more of the management components 110 of FIG. 1, as well as one or more of the power line communication units 106 of FIG. 1, may be integrated into the sub-system 200, as is described in the following sections of the detailed description, or may be external to the sub-system 200.

Verification of Proper Coupling of Communication Units to Power Circuits

Figure 3:
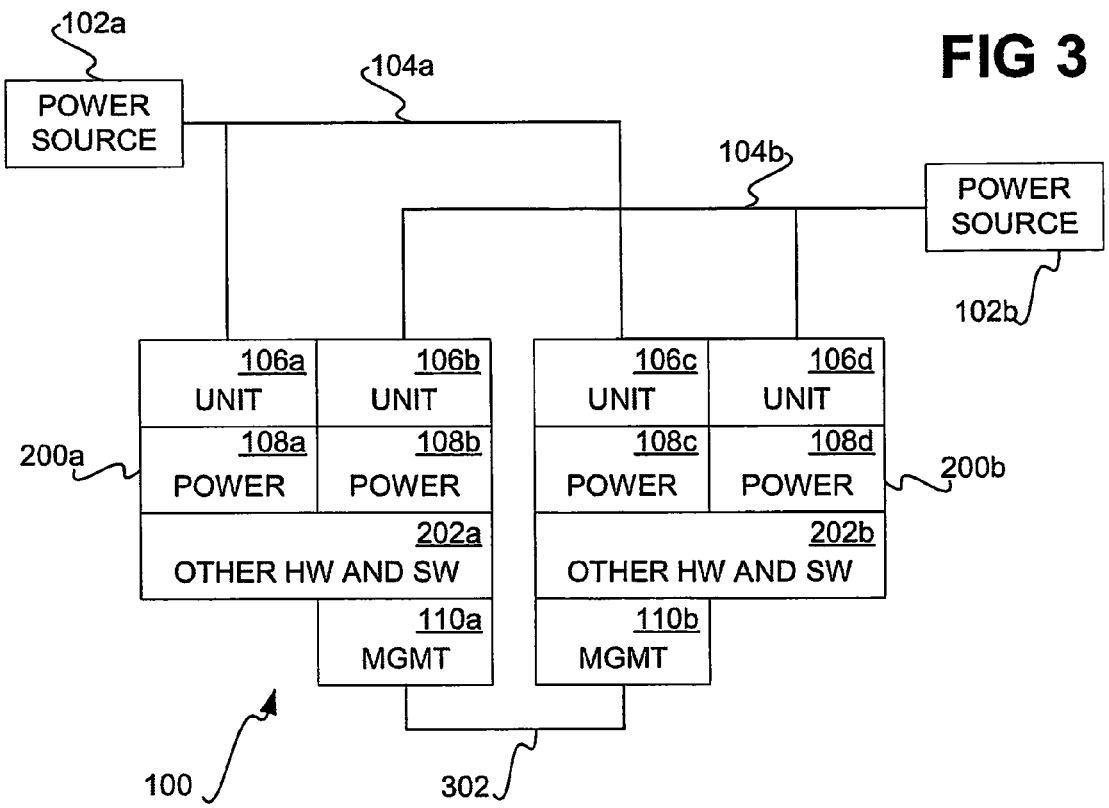
FIG. 3 is a diagram of a system with verified correctly configured power line communication units, according to an embodiment of the invention.

FIG. 3 shows an embodiment of the invention where the system 100 includes two sub-systems 200a and 200b, two power sources 102a and 102b, and two power circuits 104a and 104b. The sub-system 200a includes power line communication units 106a and 106b for its power supplies 108a and 108b, as well as other hardware and software 202a, and a management component 110a. Similarly, the sub-system 200b includes power line communication units 106c and 106d for its power supplies 108c and 108d, as well as other hardware and software 202b, and a management component 110b. The components 110a and 110b are networked via a network 302, and may be software running on their corresponding sub-systems 200a and 200b, respectively.

The power circuit 104a is connected to the power source 102a. The power line communication units 106a and 106c of the sub-systems 200a and 200b, respectively, and thus the power supplies 108a and 108c of the sub-systems 200a and 200b, respectively, are plugged into or otherwise connected to the power circuit 104a. The power circuit 104b is connected to the power source 102b. The power source 102b is preferably a different source of power than the power source 102a, but alternatively may be the same source of power as the power source 102b. The power line communication units 106b and 106d of the sub-systems 200a and 200b, respectively, and thus the power supplies 108b and 108d of the sub-systems 200a and 200b, respectively, are plugged into or otherwise connected to the power circuit 104a.

The topology of the system 100 as depicted in FIG. 3 thus represents a proper connecting of the power line communication units and the power supplies of the sub-systems 200a and 200b to the power circuits 104a and 104b. Each of the sub-systems 200a and 200b has a communication unit and a power supply that connects to the power circuit 104a, and also has a communication unit and a power supply that connects to the power circuit 104b. That is, each sub-system 200a and 200b has power circuit redundancy, in that each has power supplies and communication units connecting to two different power circuits.

The system 100 as depicted in FIG. 3 preferably operates as follows. The power line communication unit 106a sends its identifier over the power circuit 104a, and receives the identifier of the communication unit 106c from over the power circuit 104a The communication unit 106b sends its identifier over the power circuit 104b, and receives the identifier of the communication unit 106d from over the power circuit 104b. The unit 106c sends its identifier over the circuit 104a, and receives the identifier of the unit 106a from over the circuit 104a. The unit 106d sends its identifier over the circuit 104b, and receives the identifier of the unit 106b over the circuit 104b. The units 106a and 106b send their own identifier and the identifier they received to the management component 110a, whereas the units 106c and 106d send their own identifier and the identifier they received to the management component 110b.

The management component 110a therefore receives the identifiers for the power line communication units 106a and 106c from the communication unit 106a, and the identifiers for the communication units 106b and 106d from the unit 106b. Because the management component 110a did not receive the identifiers of both the units 106a and 106b of the sub-system 200a from either of the units 106a and 106b, the component 110a concludes that the units 106a and 106b, and hence the power supplies 108a and 108b, are properly connected to the power circuits 104a and 104b. That is, the component 110a is able to conclude that units 106a and 106b do not share a common power circuit, and are instead on separate circuits.

Similarly, the management component 110b receives the identifiers for the power line communication units 106a and 106c from the communication unit 106c, and the identifiers for the communication units 106b and 106d from the communication unit 106d. Because the management component 110b did not receive the identifiers of both the units 106c and 106d of the sub-system 200b from either of the units 106c and 106d, the component 110b concludes that the units 106c and 106d, and hence the power supplies 108c and 108d, are properly connected to the power circuits 104a and 104b.

That is, the component 110b is able to conclude that the units 106c and 106d do not share a common power circuit, and are instead on separate circuits.

The management components 110a and 110b may also share the information they receive with one another through the optional network 302 that communicatively connects them. In the embodiment of FIG. 3, for instance, the management components 110a and 110b may verify that the identifiers collected from one of the power line communication units 106a and 106b correspond to the identifiers collected from one of the power line communication units 106c and 106d. For instance, the unit 106a received the identifier for the unit 106c, and sent both its identifier and the identifier for the unit 106c to the management component 110a. However, the unit 106c might erroneously report only its own identifier to the management component 110b. One set of identifiers received by the component 110a thus includes the identifiers for the units 106a and 106c, whereas the only set of identifiers received by the component 110b that includes the identifier for the unit 106c does not include the identifier for the unit 106a. This can signal the component 110b that the communication unit 106c of the sub-system 200b is malfunctioning.

Figure 4:
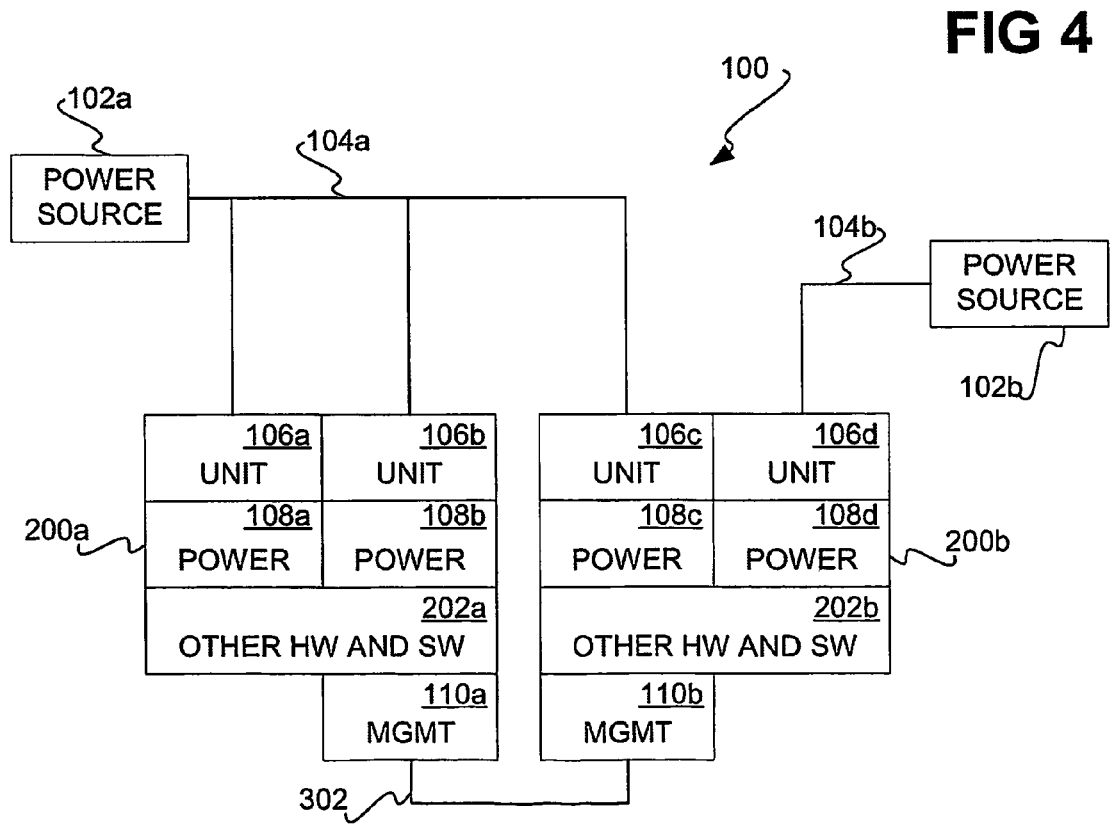
FIG. 4 is a diagram of a system with verified incorrectly configured power line communication units, according to an embodiment of the invention.

FIG. 4 shows the system 100 of the embodiment of FIG. 3 where the power line communication units 106a, 106b, 106c, and 106d are not properly connected to the power circuits 104a and 104b. Specifically, the communication units 106a and 106b of the sub-system 200a are both connected to the same power circuit, the power circuit 104a. The units 106a and 106b will both send their identifiers over the power circuit 104a, and in return receive the identifier of the other, as well as the identifier for the communication unit 106c of the sub-system 200b.

When the management component 110a collects these identifiers from the units 106a and 106b, it will discover that the unit 106a received the identifier for the unit 106b, as well as for the unit 106c, and that the unit 106b received the identifier for the unit 106a, as well as for the unit 106c. Because the units 106a and 106b received each other's identifier over the same power circuit, the verification performed by the component 110a as to whether the communication units 106a and 106b, and their corresponding power supplies 108a and 108b, are properly connected to the power circuits fails. That is, the management component 110a concludes that that the communication units 106a and 106b, and their corresponding power supplies 108a and 108b, are connected to the same power circuit, the power circuit 104a.

Figure 5:
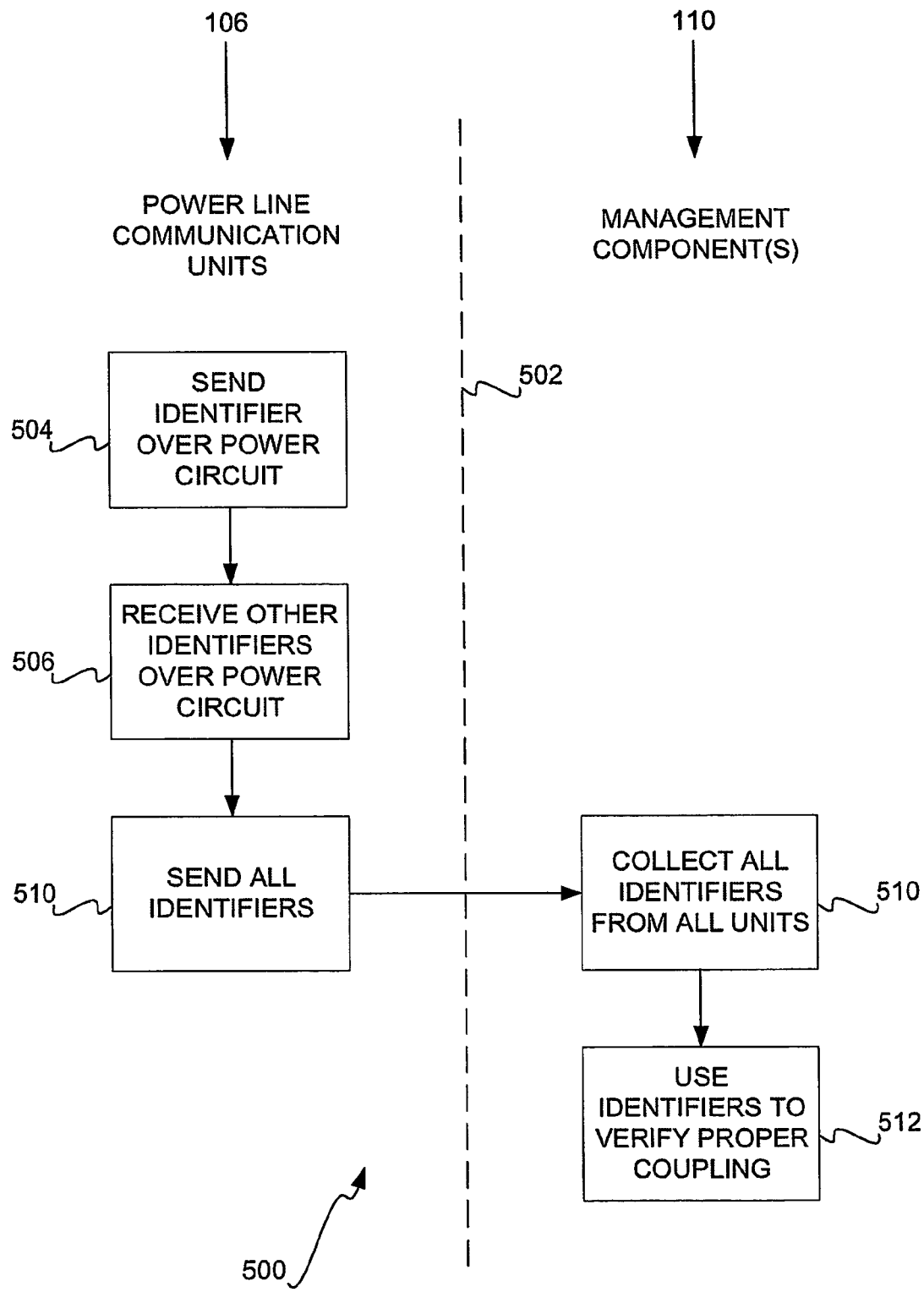
FIG. 5 is a flowchart of a method for verifying the configuration of the power line communication units of FIGS. 3 and/or 4, according to an embodiment of the invention.

FIG. 5 shows a method 500 that summarizes the actions performed by the power line communication units 106 and the management component(s) 110 in the system 100 as depicted in the embodiments of FIGS. 3 and 4. Parts of the method 500, as well as other methods according to other embodiments of the invention, can be implemented as one or more means stored in a computer-readable medium of an article of manufacture. The medium may be a modulated carrier signal, a data storage medium, or another type of computer-readable medium. The dotted line 502 separates those parts of the method 500 performed by the power line communication units 106 from those parts performed by the management component(s) 110.

First, each of the power line communication units sends its identifier over the power circuit to which it is coupled (504). Each power line communication unit also receives the identifiers of other power line communication units also connected to the same power circuit (506). Each communication unit then sends all these identifiers, including its own identifier and the other identifiers it received (508), which are collected by the management component(s) (510). The management component(s) use these identifiers to verify that the power line communication units, and their corresponding power supplies, are properly coupled to the power circuits (512), as has been described.

Verification where Power Components are Connected to Power Circuits

Power components are occasionally inserted into power circuits, such that identifiers sent by power line communication units over the power circuits do not reach the other power line communication units, but instead stop at the power components. The power components can include uninterruptible power supplies (UPS's), as well as other types of power components. In one embodiment, a power component relays identifiers received on one side of the power circuit in which it is inserted to the other side, and vice-versa. This embodiment effectively functions as has been described in the previous section of the detailed description.

Figure 6:
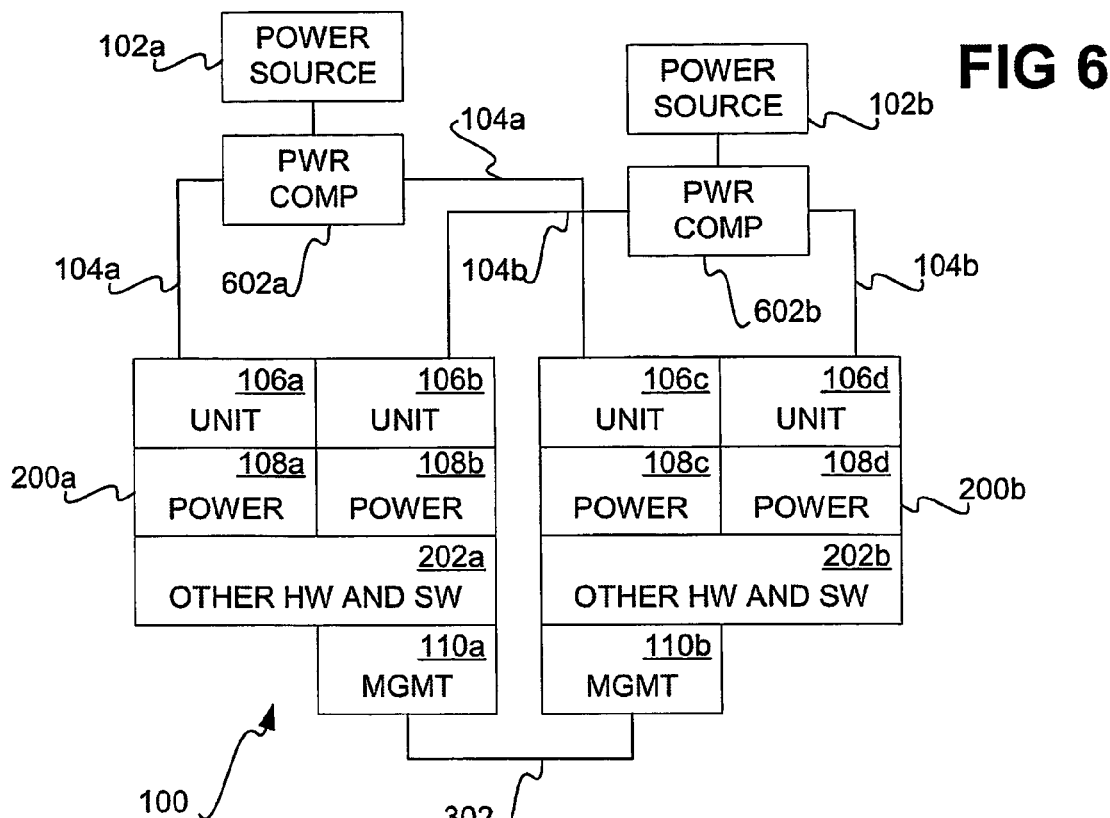
FIG. 6 is a diagram of a system with verified correctly configured power line communication units and that also includes one or more stand-alone power components, according to an embodiment of the invention.

Alternatively, however, the power components may instead transmit their own identifiers. FIG. 6 shows the system 100 according to such an embodiment. The power component 602a has been inserted in the power circuit 104a, whereas the power component 602b has been inserted in the power circuit 104b. The power source 102a is thus connected to the power circuit 104a through the component 602a, whereas the power source 102b is connected to the power circuit 104b through the component 602b. The power line communication unit 106a sends its own identifier over the power circuit 104a, as does the power communication unit 106c. The power component 602a also sends its own identifier over the power circuit 104a, but prevents the identifier sent by the unit 106a from reaching the unit 106c, and vice-versa. Therefore, the unit 106a receives only the identifier for the power component 602a, as does the unit 106c.

Similarly, the power line communication unit 106b sends its own identifier over the power circuit 104b, as does the power communication unit 106d. The power component 602b also sends its own identifier over the power circuit 104b, but prevents the identifier sent by the unit 106b from reaching the unit 106d, and vice-versa. The unit 106b receives only the identifier for the power component 602b, as does the unit 106d. The management component 110a collects the identifiers for the unit 106a and for the power component 602a from the unit 106a, and the identifiers for the unit 106b and for the power component 602b from the unit 106b. The management component 110b collects the identifiers for the unit 106c and for the component 602a from the unit 106c, and the identifiers for the unit 106d and for the component 602b from the unit 106b.

The management components 110a and 110b are still, however, able to verify that their power line communication units, and the power supplies corresponding to these units, are properly coupled to the power circuits 104a and 104b. For the management component 110a, this is because the identifiers collected from the communication unit 106a have no identifiers in common with those collected from the communication unit 106b. For the management component 110b, this is because the identifiers collected from the communication unit 106c have no identifiers in common with those collected from the communication unit 106d. The management components 110a and 110b can also share the identifiers they collected with one another via the network 302 to, for instance, determine the topology of the power components and the communication units connected to the power circuits 104a and 104b.

FIG. 7 shows a method 700 that summarizes the actions performed by the power components 600, the power line communication units 106, and the management component(s) 110 in the system 100 as depicted in the embodiment of FIG. 6. The dotted lines 702 and 704 separate those parts of the method 700 performed by the power components 602, by the power line communication units 106, and by the management component(s) 110. First, the power line communication units each send its identifier over the power circuit to which it is coupled (504). Likewise, the power components each send its identifier over all parts of the power circuit to which it is coupled (706). Each communication unit receives other identifiers over the power circuit to which it is coupled (506).

Specifically, each communication unit receives the identifier for the power component also connected to the same power circuit, if there is such a power component. If there is no power component connected to the same power circuit as a given communication unit, then the unit instead receives the identifier for any other communication units coupled to the same power circuit. The power line communication units each send its own identifier and the identifier(s) it received over the power circuit to which it is coupled (508), which are then collected by the management component(s) (510). The management component(s) verify that the communication units, and their corresponding power supplies, are properly coupled to the power circuits based on the identifiers received, as has been described.

Figure 8:
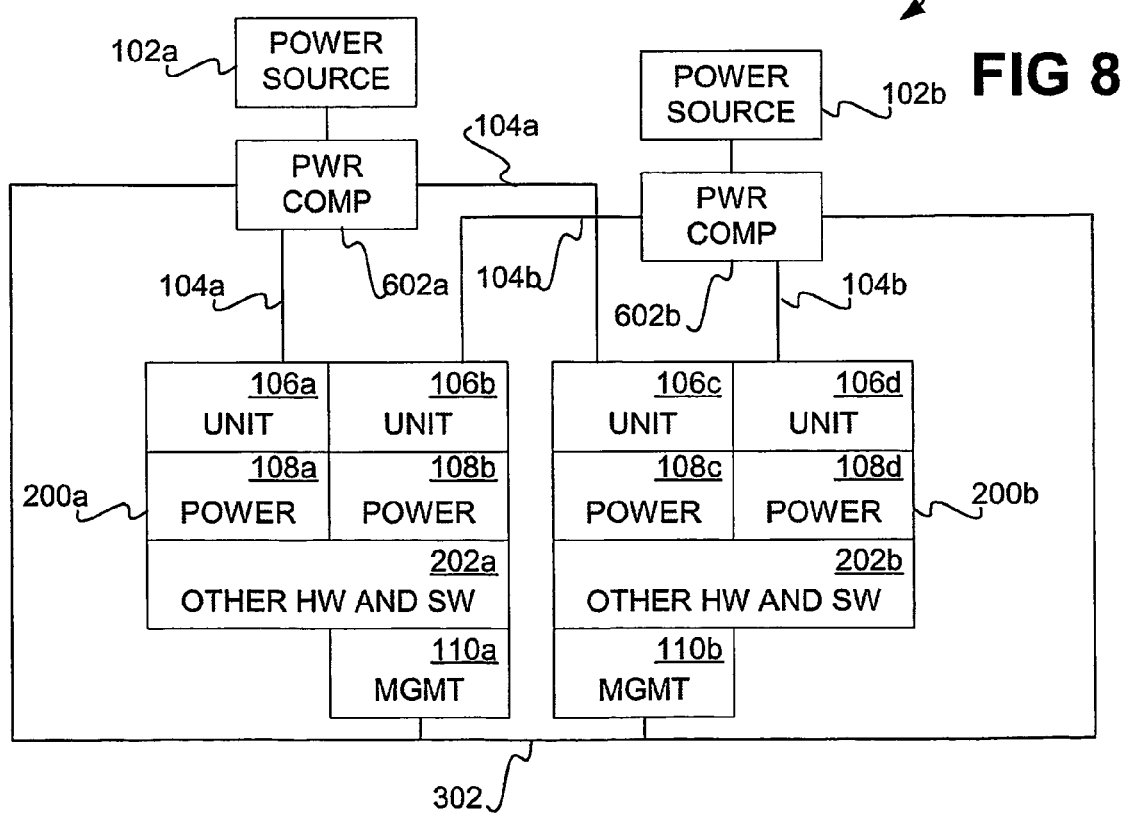
FIG. 8 is a diagram of a system with verified correctly configured power line communication units and that also includes one or more power components communicatively coupled to the one or more management components, according to an embodiment of the invention.

The power components may also be connected to the same optional network as the management components are, in which case the management components can more easily determine whether the power line communication units, and their corresponding power supplies, are properly coupled to the power circuits. FIG. 8 shows the system 100 according to such an embodiment. The embodiment of FIG. 8 is identical to that of FIG. 6, except that the power components 602a and 602b are coupled to the same network 302 as the management components 110a and 110b are.

The system 100 as depicted in FIG. 8 operates as follows. The power line communication units 106a, 106b, 106c, and 106d again send their identifiers over the power circuits to which they are coupled. Communication units 106a and 106c hence send their identifiers over the power circuit 104a, whereas the units 106b and 106d send their identifiers over the power circuit 104b. However, in the embodiment of FIG. 8, the power components 602a and 602b do not send their own identifiers for receipt by the communication units 106a, 106b, 106c, and 106d.

Rather, the power components 602a and 602b receive the identifiers sent by the units 106a and 106c over the power circuit 104a, and by the units 106b and 106d over the power circuit 104b, respectively. The power components 602a and 602b then send the identifiers they received to the management components 110a and 110b, over the network 302. The management components 110a and 110b use the identifiers sent by the power components 602a and 602b to verifies that the power line communication units 106a and 106b, and 106c and 106d, respectively, are properly coupled to the power circuits 104a and 104b.

Specifically, the management component 110a determines whether the identifiers for the power line communication units 106a and 106b of its sub-system 200a have not been both collected by either the power component 602a or 602b. Because the component 602a only collected the identifier for the unit 106a, and the component 602b only collected the identifier for the unit 106b, the management component 110a concludes that neither the unit 106a nor 106b is coupled to the same power circuit. Similarly, the management component 110b determines whether the identifiers for the units 106c and 106d of its sub-system 200b have not been both collected by either the power component 602a or 602b. Because the component 602a only collected the identifier for the unit 106c, and the component 602b only collected the identifier for the unit 106d, the management component 110b concludes that neither the unit 106c nor unit 106d is coupled to the same power circuit.

FIG. 9 shows a method 900 that summarizes the actions performed by the power components 600, the power line communication units 106, and the management component(s) 110 in the system 100 as depicted in the embodiment of FIG. 8. The dotted lines 902 and 904 separate those parts of the method 900 performed by the power components 602, by the power line communication units 106, and by the management component(s) 110. First, each of the power line communication units sends its identifier over the power circuit to which it is coupled (504). The power components each receive the identifiers sent by the communication units coupled to the same power circuit (906). Each of the power components then sends the identifiers of the communication units it received (908), which are collected by the management component(s) (510). The management component(s) use these identifiers to verify that the communication units, and their corresponding power supplies, are properly coupled to the power circuits, as has been described (512).

Other Verification with a Management Component

Embodiments of the invention that have been described so far explicitly relate to the scenario where power line communication units have corresponding power supplies, and where the communication units are used to assist verification by management components that the power supplies are properly coupled to power circuits. However, power line communication units, in conjunction with one or more management components, can be used for other types of verification as well. The verification performed by embodiments of the invention is verification that the power line communication units are properly coupled to power circuits, and not necessarily power supplies that may correspond to such communication units.

Figure 10:
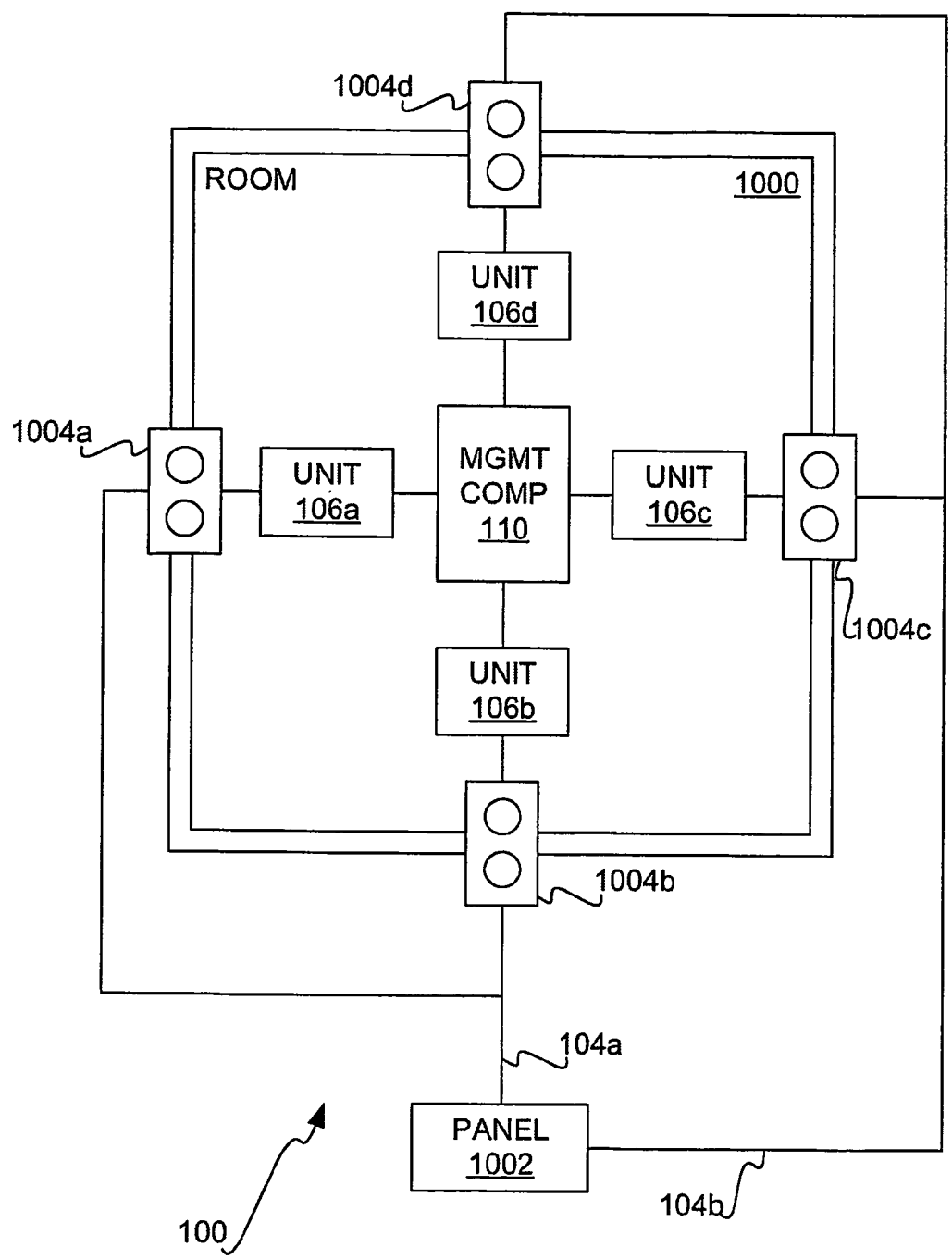
FIG. 10 is a diagram of a system having a management component for verifying the configuration of power line communication units, according to an embodiment of the invention.

FIG. 10 shows the system 100 according to such an embodiment. A room 1000 of a building has a number of power outlets 1004a, 1004b, 1004c, and 1004d. The outlets 1004a and 1004b are connected to the electrical panel 1002 through the power circuit 104a, whereas the outlets 1004c and 1004d are connected to the electrical panel 1002 through the power circuit 104b. An electrician may wish to verify that the outlets 1004a, 1004b, 1004c, and 1004d of the room 1000 are connected to more than one power circuit, and uses this as a definition of proper coupling. The electrician may also desire to map the outlets to different power circuits, and hence different circuit breakers or fuses in the electrical panel 1002.

A power line communication unit is plugged into each outlet. The communication unit 106a is plugged into the outlet 1004a, the unit 106b is plugged into the outlet 1004b, the unit 106c is plugged into the outlet 1004c, and the unit 106d is plugged into the outlet 1004d. The communication units 106a, 106b, 106c, and 106d are then themselves communicatively coupled to the management component 110. The system 100 operates as has been described in relation to FIGS. 3 and 4. That is, each of the units sends an identifier over the power circuit to which it is coupled and receives the identifiers of other communication units plugged into the same power circuit.

The unit 106a thus sends its identifier over the power circuit 104a and receives the identifier for the unit 106b. Similarly, the unit 106b sends its identifier over the circuit 104a and receives the identifier for the unit 106a. The unit 106c sends its identifier over the power circuit 104b and receives the identifier for the unit 106d, whereas the unit 106d sends its identifier over the circuit 104b and receives the identifier for the unit 106c. Each communication unit then reports the identifier it sent and the identifier(s) it received from other communication units to the management component 110.

The management component 110 is thus able to conclude that the outlets 1004a and 1004b to which the units 106a and 106b are plugged are coupled to the same power circuit 104a, and that the outlets 1004c and 1004d to which the units 106c and 106d are plugged are coupled to the same power circuit 104b. The units 106a, 106b, 106c, and 106d, and the outlets 1004a, 1004b, 1004c, and 1004d into which they are plugged, are thus verified by the management component 110 to be properly connected to the power circuits 104a and 104b. The electrician is able to map which of the outlets are connected to which of the power circuits as well.

Advantages over the Prior Art

Embodiments of the invention provide for advantages over the prior art. The use of power line communication units sending identifiers over the power circuits to which they are coupled enables the one or more management components to determine whether the communication units are coupled to the correct power circuits. That is, the one or more management components are able to verify whether the communication units are properly coupled to the power circuits. Where each communication unit corresponds to a different power supply, this can ensure that mission-critical systems are properly connected to redundant power circuits, to the same or different power sources. Furthermore, some embodiments of the invention allow for the scenario where power components, such as uninterruptible power supplies (UPS's), are also connected to the power circuits.

Other Alternative Embodiments

It will be appreciated that, although specific embodiments of the invention have been described herein for purposes of illustration, various modifications may be made without departing from the spirit and scope of the invention. For instance, in the embodiment of the invention in which power components are present, such power components have been described as uninterruptible power supplies (UPS's). However, other power components besides UPS's can also be used by the invention. Furthermore, whereas the invention has been substantially described in relation to power line communication units corresponding to power supplies or outlets, such relationships are not necessary and not restricted by the invention. Accordingly, the scope of protection of this invention is limited only by the following claims and their equivalents.

We claim:

1. A system comprising:
    two or more power line communication units, each coupled to and sending an identifier over at least one power circuit; and,
    a management component responsive to at least some of the identifiers sent over the power circuits and including a representation or verification of couplings of the communications units to the at least one power circuit, the management component to verify whether the power line communication units are properly coupled to the power circuits based on the identifiers sent.

2. The system of claim 1, wherein each communication unit further receives other identifiers over the at least one power circuit, and the management component is further responsive to at least some of the other identifiers received by each communication unit.

3. The system of claim 2, further comprising a power component coupled to and sending an identifier over the at least one power circuit; and wherein the management component is further responsive to the identifier sent by the power component.

4. The system of claim 1, further comprising a power component coupled to the at least one power circuit and receiving the identifiers over the at least one power circuit and sending the identifiers received to the management component.

5. The system of claim 1, further comprising a plurality of sub systems, each sub system encompassing at least one of the power line communication units; and wherein the management component includes a verification or representation of connections of the power line communication units of each sub system to the at least one power circuit.

6. The system of claim 5, wherein each sub system has a corresponding management component that includes a verification or representation of connections of the power line communication units of said sub-system to the at least one power circuit.

7. The system of claim 5, comprising two or more power circuits; and wherein the management component includes a verification of connections of the power line communication units of each sub system to at least two of the power circuits.

8. The system of claim 1, further comprising a plurality of power supplies corresponding to the power line communication units.

9. The system of claim 1, further comprising a sub-system including the two or more power line communication units, two or more power supplies each coupled to one of the communication units, and the management component.

10. The system of claim 1, further comprising two or more management components.

11. The system of claim 10, wherein the plurality of management components are networked together.

12. The system of claim 1, wherein the at least one power circuit comprises two or more power circuits, and at least some of the power circuits correspond to different power sources.

13. A method comprising:
collecting a plurality of identifiers sent by a plurality of power line communication units over one or more power circuits to which the plurality of power line communication units are coupled; and,
verifying or representing couplings of the power line communication units to the one or more power circuits by using at least some of the plurality of identifiers, such that whether the power line communication units are properly coupled to the power circuits is determined based on the identifiers sent.

14. The method of claim 13, wherein the one or more power circuits comprise a plurality of power circuits; and wherein verifying or representing that the power line communication units are properly coupled to the one or more power circuits comprises verifying or representing that a plurality of sub systems over which the plurality of power line communication units are partitioned each has a sub plurality of power line communication units partitioned thereto that are coupled to more than one of the plurality of power circuits.

15. The method of claim 13, wherein the plurality of identifiers are collected directly from the plurality of power line communication units, each communication unit sending for collection a self identifying one of the plurality of identifiers.

16. The method of claim 15, wherein each communication unit also sends for collection one or more other identifiers received over the one or more power circuits; and wherein using at least the plurality of identifiers comprises also using at least some of the other identifiers sent by each communication unit.

17. The method of claim 13, wherein the plurality of identifiers are collected directly from one or more power circuit components receiving the plurality of identifiers from over the one or more power circuits over which the plurality of power line communication units sent the plurality of identifiers.

18. An article for use with identifiers produced by two or more power line communication units connected to at least one power circuit, the article comprising:
a computer-readable medium;
a power circuit identifier receiver in the medium responsive to the identifiers;
a management component in the medium, and responsive to the power circuit identifier receiver, and including a verification or representation of connections of at least some of the two or power line communication units to the at least one power circuit, the management component to verify whether the power line communication units are properly coupled to the power circuits based on the identifiers sent.

19. The article of claim 18, wherein the power circuit identifier receiver is further responsive to other identifiers received by at least some of the power line communication units from others of the power line communication units and sent by said at least some of the power line communication units to the power circuit identifier receiver; and wherein the management component is further responsive to the other identifiers, and further includes a verification or representation of whether said at least some of the power line communication units and said others of the power line communication units are connected to the same power circuit.

20. The article of claim 18, wherein the medium is one of a modulated carrier signal and a recordable data storage medium.

* * * * *